UNITED STATES PATENT OFFICE.

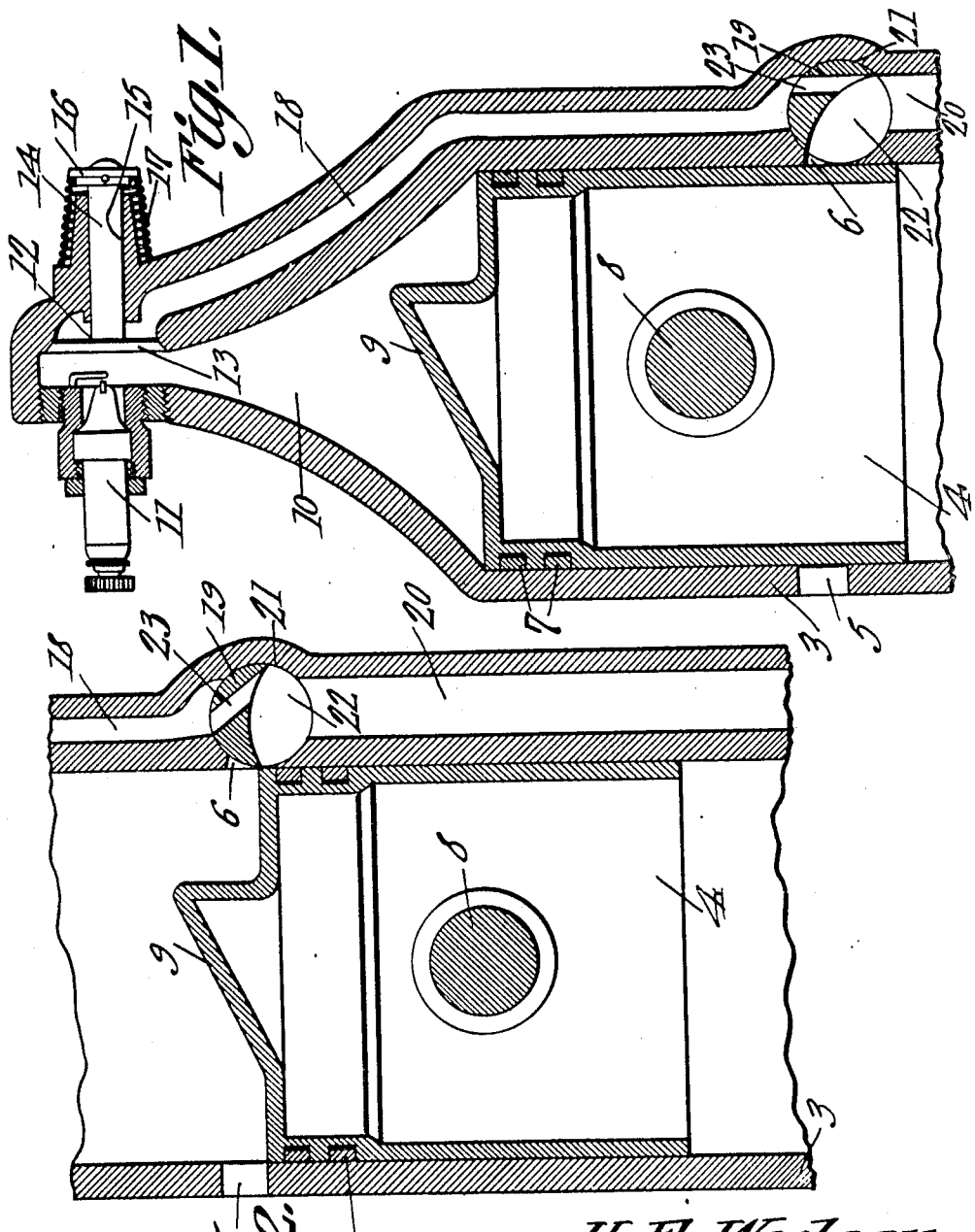

HORACE E. WOOLERY, OF FAIRMONT, MINNESOTA.

INTERNAL-COMBUSTION ENGINE.

1,101,374.  Specification of Letters Patent.  Patented June 23, 1914.

Application filed December 6, 1913. Serial No. 805,083.

*To all whom it may concern:*

Be it known that I, HORACE E. WOOLERY, a citizen of the United States, residing at Fairmont, in the county of Martin and State of Minnesota, have invented a new and useful Internal-Combustion Engine, of which the following is a specification.

This invention relates to internal combustion engines.

An object of the present invention is to provide an internal combustion engine of the two cycle type which may be throttled to low speeds without retarding the spark and without causing the engines to miss explosions.

Another object is to provide an internal combustion engine with an auxiliary by pass for the admission of fuel and which communicates with the combustion chamber juxtaposed the spark plug so that small charges may be introduced within the combustion chamber and may be successfully exploded.

A further object is to provide a valve which will supply fuel to the main intake port of the engine or may supply fuel to a by pass which leads to the upper extremity of the combustion chamber whereby the fuel will be heated while traversing the passage to the auxiliary inlet port and by means of which small quantities of fuel may be exploded so that the engine may run at excessively low speed under light loads or while running free, and without causing the engine to miss explosions.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a longitudinal sectional view of the upper portion of my improved internal combustion engine. Fig. 2 is a similar view in which the piston is represented at its lowermost point of travel and the throttling valve has closed the main intake port and the gaseous fuel must pass through the auxiliary by-pass.

Referring to the drawings in which similar reference numerals designate corresponding parts throughout the several views, the engine cylinder 3 is provided with the piston head 4, which latter controls the exhaust port 5 and inlet port 6 in the usual manner. The piston head is provided with the usual rings 7, wrist pin 8, and baffle plate 9. The cylinder 3, at its upper portion, tapers to form the combustion chamber 10 in the upper extremity of which is positioned the ignition apparatus illustrated in the present drawings as taking the form of a spark plug 11. Located on approximately the same horizontal plane with the spark plug 11 is the valve 12. The valve is of the puppet type and includes the valve head 13 and shank 14. The shank 14 extends through an apertured boss 15 and is provided at its outer extremity with a collar or nut 16. A spring 17 engages the collar or nut and resiliently holds the valve in a closed position. An auxiliary by pass 18 communicates with and is controlled by the valve. The auxiliary passage or by pass 18 extends down the side wall of the cylinder and communicates with a throttling valve 19. Thus it will be apparent that the gaseous fuel which makes its way or passes through the passage 18 will be heated to a high temperature so that it will be in a highly combustible condition upon its entrance into the combustion chamber through the puppet valve 12.

The fuel supply passage 20 is enlarged as at 21 and in which enlargement is located the valve 19. The valve 19 is of the rocking type and is provided with a main passage 22 leading therethrough and which controls the amount of fuel supplied to the cylinder through the intake port 6. The valve 19 is also provided with the auxiliary opening 23 extending therethrough and which controls the quantity of carbureted air or fuel supplied to the auxiliary passage 18.

When it is desired to run the engine at normal speeds and under normal loads the throttling valve is positioned with the opening 22 thereof communicating with the intake port 6 so that the carbureted air or fuel will be supplied to the intake port 6 in the usual manner. When, however, it is desired to run the engine at excessively low speed or under little or no load, the intake port 6 is closed by turning the valve to the position illustrated.

The auxiliary passage or opening 23 allows a limited quantity of fuel to pass through the by-pass and through the puppet valve 12. The quantity of fuel passing through the opening 23 may be regulated by rotating the valve and may be entirely closed by rotating the valve in an anti-clockwise direction from the position shown in Fig. 2. It is noted that the auxiliary charge which passes through the valve 12 will enter the combustion chamber at such times as the internal pressure within the combustion chamber is lower than the pressure within the auxiliary by-pass minus the force exerted upon the valve by means of the spring 17. The resiliency of spring 17 can be changed so that the fuel can be admitted under the proper conditions.

The many advantages accruing from the structure disclosed it is thought will be apparent, among which is mentioned the high temperature to which the fuel will be heated during its passage through the auxiliary by-pass thus providing for a more highly combustible mixture and one which will more easily ignite. A further advantage is due to the fact that a limited charge may be admitted in the combustion chamber adjacent the ignition device so that exceedingly small charges may be admitted into the engine cylinder or combustion chamber and properly exploded. It has been found in practice to be extremely difficult to throttle engines of the present type to low speeds largely due to the fact that if a small charge be introduced through the ordinary intake port 6, the quantity of heated gases in the cylinder will be relatively large with respect to the quantity of combustible mixture therein so that the combustible gases do not come into contact with the ignition device with the result that the engine misses explosions. However, when the engine is to be run at normal speed under normal loads, the quantity of gas admitted in the cylinder is sufficient to insure the ignition thereof. With the device herein disclosed, a small quantity of carbureted air or gaseous air is introduced in the combustion chamber upon approximately the same plane as the ignition device so that an explosion is insured regardless of the quantity of gases within the cylinder. Thus the engine may be run at excessively low speeds and without requiring that the spark be retarded.

Having thus fully described my invention, what I claim is:—

A two cycle explosive engine including a cylinder with a conical combustion chamber disposed in the upper portion thereof, ignition means extending within said conical combustion chamber in the apex thereof, said cylinder provided with inlet and exhaust ports, a piston slidably disposed in said cylinder and controlling the said ports, a valve controlling the inlet port, an auxiliary by-passage communicating with said valve extending to and communicating with the apex of said combustion chamber, an automatic valve disposed in the upper portion of said by-pass, said inlet port controlling valve provided with a restricted passage extending therethrough adapted to supply limited quantity of fuel to the said auxiliary by-passage.

In testimony that I claim the foregoing as my own, I have hereto affixed my signature in the presence of two witnesses.

HORACE E. WOOLERY.

Witnesses:
H. P. EDWARDS,
G. F. ANDERSON.

Copies of this patent may be obtained for five cents each, by addressing the "Commissioner of Patents, Washington, D. C."